United States Patent
Weber et al.

(10) Patent No.: US 9,009,852 B2
(45) Date of Patent: Apr. 14, 2015

(54) METHOD, SOA REGISTRY AND SOA REPOSITORY FOR GRANTING A USER SECURE ACCESS TO RESOURCES OF A PROCESS

(75) Inventors: Heiko Weber, Pfungstadt (DE); Juliane Harbarth, Griesheim (DE); Andreas Fröhlich, Darmstadt (DE); Harald Schöning, Dieburg (DE); Michael Gesmann, Darmstadt (DE)

(73) Assignee: Software AG, Darmstadt (DE)

( * ) Notice: Subject to any disclaimer, the term of this patent is extended or adjusted under 35 U.S.C. 154(b) by 1232 days.

(21) Appl. No.: 12/458,736

(22) Filed: Jul. 21, 2009

(65) Prior Publication Data
US 2010/0223666 A1 Sep. 2, 2010

(30) Foreign Application Priority Data
Feb. 27, 2009 (EP) .................... 09002851

(51) Int. Cl.
G06F 21/62 (2013.01)
(52) U.S. Cl.
CPC ............ *G06F 21/62* (2013.01); *G06F 21/6218* (2013.01)
(58) Field of Classification Search
None
See application file for complete search history.

(56) References Cited

U.S. PATENT DOCUMENTS

| | | | |
|---|---|---|---|
| 6,275,825 B1 * | 8/2001 | Kobayashi et al. | 707/737 |
| 7,130,880 B1 * | 10/2006 | Burton et al. | 709/203 |
| 7,904,720 B2 * | 3/2011 | Smetters et al. | 713/175 |
| 2005/0039033 A1 * | 2/2005 | Meyers et al. | 713/193 |
| 2007/0076228 A1 * | 4/2007 | Apelbaum et al. | 358/1.1 |
| 2008/0047010 A1 | 2/2008 | Marceau | |
| 2008/0086473 A1 | 4/2008 | Searl et al. | |
| 2009/0055366 A1 * | 2/2009 | Smith et al. | 707/4 |
| 2009/0193057 A1 * | 7/2009 | Maes | 707/200 |
| 2009/0249287 A1 * | 10/2009 | Patrick | 717/107 |
| 2010/0094905 A1 * | 4/2010 | Nikolov et al. | 707/792 |

OTHER PUBLICATIONS

Sandhu, Role-Based Access Control Models, Feb. 1996, George Mason University and SETA Corporation, pp. 38-47.*
Hollingsworth, Workflow Management Coalition, The Workflow Reference Model, Document No. TC00-1003, Issue 1.1, retrieved from archive.org, https://web.archive.org/web/20060202135544/http://www.aiai.ed.ac.uk/project/wfmc/ARCHIVE/DOCS/refmodel/rmv1-16.html. Feb. 2, 2006, pp. 1-45.*
"Role-Based Access Control Models", Sandhu et al., IEEE Computer, vol. 29, No. 2, Feb. 1, 1996, pp. 38-47.
"Access Control: Principles and Practice" Sandhu et al., IEEE Communications Magazine, IEEE Service Center, vol. 32, No. 9, Sep. 1, 1994, pp. 40-48.

* cited by examiner

*Primary Examiner* — Jung Kim
*Assistant Examiner* — James J Wilcox
(74) *Attorney, Agent, or Firm* — Nixon & Vanderhye, P.C.

(57) ABSTRACT

The present technology relates to a method for granting a user secure access to one or more resources accessed by a process. The process is defined in a Service-Oriented Architecture (SOA) registry and includes one or more process-steps, where each process-step accesses one or more resources stored in an SOA repository.

20 Claims, 15 Drawing Sheets

Figure 1:
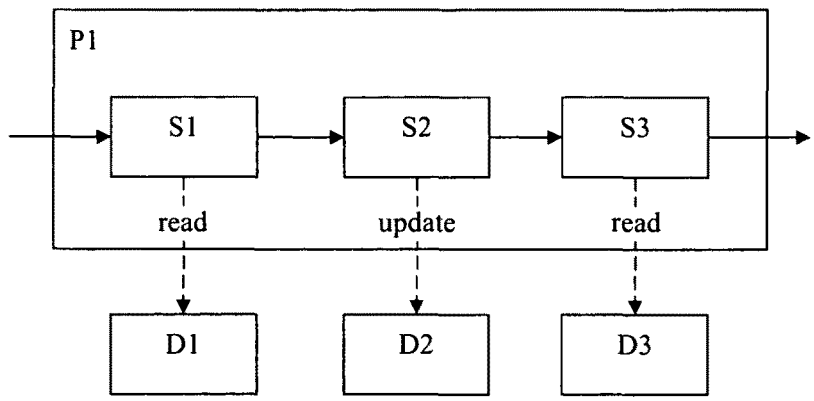

METHOD, SOA REGISTRY AND SOA REPOSITORY FOR GRANTING A USER SECURE ACCESS TO RESOURCES OF A PROCESS

This application claims priority to European Patent Application No. 09002851.5 filed 27 Feb. 2009, the entire contents of which is hereby incorporated by reference.

TECHNICAL FIELD

The present technology relates to a method, a SOA registry and a SOA repository for granting a user secure access to resources of a process.

BACKGROUND AND SUMMARY

Complex, processing time intensive computations in modern computer systems are typically performed as a sequence of individual computation steps. In this context, Service-Oriented Architectures (SOA) are increasingly used for controlling multiple services each executing a computation step and running on distributed computers in order to work together to execute the overall computation process. During the execution of the computation process, a huge number of resources may be consumed and produced as inputs, outputs and intermediate results. Such resources may be documents that comprise e.g. engineering data of a new automobile under development or other highly confidential data. Avoiding access to the confidential resources by unauthorized users is crucial in order to ensure the security of the overall computation process. Users may in this context be human users or other computer systems or computation steps.

From the prior art, techniques are known for ensuring instance-based document security. To this end, a collection of so-called principals (e.g. users, roles, groups, etc.) may be defined in such systems. Each document that is subject to security, i.e. that comprises security-relevant information, has a list of security settings attached that define which principal has which access right/access privilege (e.g. read, update, delete, etc.) upon the respective document. Typically, security settings are not only attached document-wise but defined individually for different document versions. Security settings, also called policies, may e.g. be defined by access control lists (ACL). However, in view of the huge number of resources involved in complex computations, which typically consume and produce thousands of resources in different versions, defining adequate security settings for each individual resource or resource version is highly difficult or even impossible. This problem is commonly solved in the prior art by granting a user far too many access rights or, even worse, an overall access right, which poses a severe security risk, since the confidential information could be freely accessed. Therefore, access rights must be applied as restrictive as possible.

Furthermore, especially security-related processes have to be maintained, i.e. inspected on a regular basis and possibly modified in order to ensure that the security-related process works as expected. The problem of granting adequate access rights is intensified in this context. Such maintenance or inspection is typically done by special maintenance/inspection users that on the one hand, need a certain level of access to the process, i.e. to the resources involved in the computation in order to perform the maintenance, but on the other hand, are not supposed to access certain highly confidential resources under any circumstances. The special maintenance users therefore need the exact access rights for the exact resources they are allowed to access. However, defining such exact access rights once the maintenance is due is just as difficult as initially defining access rights for the computation personnel. Additionally, when the process is modified, all access rights have to be modified accordingly in order keep the security definitions up to date and to not accidentally create security holes. Furthermore, even the discovery of which resources are actually involved in the respective process, i.e. which are the resources the maintenance/inspection users are supposed to see, is highly difficult and ineffective given the potential huge amount of resources and processes.

In the field of computer networks, the U.S. Pat. No. 7,451,071 discloses a data model for automated server configuration that allows for modeling of information relating to a computer network to be stored in a database while minimizing the effort associated with the addition of new devices to the network. The data model deals, among others, with configuration information such as ACLs. However, the document discloses a proprietary data model that is specifically designed for server configurations, which is not compatible for being employed in the field of complex computation processes, let alone SOA environments.

Furthermore, the European patent application EP 1850288 discloses an insurance policy revisioning method and apparatus. An insurance policy is stored as a plurality of discrete temporally-sequential policy data revisions. A legally binding revision for a first given date is then determined by identifying all policy data revisions effective on the first given date and choosing a most temporally recent policy data revision temporally prior to a second given date. However, the document does not relate to the granting of exact access rights in such a policy revision.

In view of the above, it is therefore the technical problem underlying the present to provide a more secure approach for granting a user secure access to the resources accessed by a process that involves only the exact access privileges required, thereby increasing the security and at least partly overcoming the above explained disadvantages of the prior art.

This problem is according to one aspect of the technology solved by a method for granting a user secure access to one or more resources accessed by a process, the process being defined in a SOA registry and comprising one or more process-steps, each process-step accessing one or more resources stored in a SOA repository. In the embodiment of claim 1, the method comprises the following steps:

a. during an execution of the process, for each resource accessed by at least one of the process-steps, creating an entry in the SOA registry determining the accessed resource;

b. creating a process-instance-role in the SOA registry;

c. for each resource accessed by at least one of the process-steps, creating an access privilege in the SOA repository that grants access to the respective resource for the process-instance-role; and d. assigning the process-instance-role to the user.

Accordingly, during an execution of a process, the resources accessed by the individual process-steps are recorded or logged in corresponding entries in the SOA registry, e.g. in the form of pointers or references onto the corresponding resources, or any other suitable form. Such resources may be documents comprising e.g. engineering data of a new automobile under development or other highly confidential data that may be accessed—i.e. created, updated, deleted etc.—during the execution of the process and its process-steps, respectively. This logging of the accessed resources has the advantage that when the process is to be inspected/revised later, it can be easily determined which resources were involved in an execution of the process by simply inspecting the corresponding entries in the SOA registry that were created or logged during the execution.

Furthermore, a process-instance-role is created in the SOA registry. Moreover, a corresponding access privilege is created in the SOA registry for each resource accessed by at least one of the process-steps. The access privileges grant access to the respective resources for the process-instance-role, i.e. they control the type of access in which the process-instance-role or a user having this role, respectively, may access the respective resources.

Finally, the newly created process-instance-role is assigned to the user. Due to his assigned role (the process-instance-role), the user is thus granted the exact access privileges he needs for the secure access to the process, i.e. to the exact resources involved by the corresponding process execution. This greatly improves the overall security, since the user is prevented from accessing other resources which do not relate to the corresponding process execution, e.g. confidential information which should be kept secret at all costs. The present technology is furthermore especially advantageous over instance-based document security known from the prior art in that access privileges are not defined document-wise, but rather process-oriented. This greatly reduces the effort when creating the access privileges and serves for a concise and adequate definition of access privileges required for a controlled and secure access to the processes' resources.

According to another aspect of the present invention technology, the above-described method steps b. and c. are also performed during the execution of the process, i.e. the creation of the process-instance-role is performed at some point in time during the process execution and preferably at the beginning of the execution. Furthermore, whenever one of the process-steps accesses a resource, a corresponding access privilege is created in the SOA registry. This is particularly advantageous, since the creation of all roles and access privileges in the SOA registry is performed automatically during, i.e. in parallel to the process execution. Thus, when a later inspection of a process is due, all required roles and access privileges are already available in the SOA registry in an up-to-date, correct and secure manner, so that the user who is responsible for the maintenance or inspection can undertake his task immediately. Lastly, also the step of assigning the process-instance-role to the user may be performed during the execution of the process, or alternatively at a later point in time.

It should be furthermore noted that the above-described method may be performed once for every execution of a process, i.e. one set of the above-described registry entries, roles, access privileges, etc. is created per process execution. The user may be assigned all of the resulting process-instance-roles or only a subset of the process-instance-roles, depending on which process executions the user is supposed to access. Especially when the process is later modified by a special maintenance user or inspected by a special revisor user, the present technology elegantly and reliably solves the problem of granting such users the exact and minimal access rights they need.

According to another aspect of the present technology, the method may comprise the further steps of creating a process-instance in the SOA registry representing the execution of the respective process, for each process-step executed by the process, creating a process-step-instance in the SOA registry representing the respective process-step and creating a relationship to the respective process-instance, wherein the entries created in step a. are added to the respective process-step-instance. Preferably, these steps are also performed during the execution of the process. Accordingly, the sequence of process-steps carried out during a process execution are logged in the SOA registry by creating corresponding registry entries, such as a process-instance entry corresponding to the process execution and process-step-instance entries corresponding to the process-steps performed during the process execution. In this case, the entries which determine the resources accessed by the process-steps may be added to the corresponding process-step-instances. This has the advantage that when a certain process is to be inspected, the SOA registry already comprises the exact information of all executions of the process, the exact steps performed by the executions and the resources accessed by these process-steps can be easily determined by inspecting the respective process-instance-step registry entries.

According to a further aspect, the entries created in step a. which determine the resources accessed by the process-steps, may also determine a type of access to the respective resource, wherein the type of access is one of the group comprising: create, update and/or delete or any kind of other type of access the process-steps performed on the resources during process execution.

Furthermore, the method may further comprise the steps of creating a process-role in the SOA registry, adding the process-instance-roles to the process-role and assigning the process-role to the user. Accordingly, not only each individual process execution is accompanied by a corresponding process-instance-role, but the process itself is further accompanied by a process-role, which is preferably the union of all process-instance-roles of the processes' executions. Hence, if the user is supposed to be authorized to revise all possible executions of the process, he simply needs to be assigned the process-role. It should be appreciated that the process-role may be automatically created when the process is initially defined, when the process is executed for the first time or at any other suitable point in time. Furthermore, the addition of the process-instance-roles to the process-role may be performed each time a new process-instance-role is created, i.e. during each execution of the process. Similar to the assignment of the process-instance-roles to the user already described above, also the process-role may be assigned to the user manually or automatically during process-execution, process definition, or alternatively at a later point in time.

In yet another aspect of the present technology, each of the one or more access privileges may be one of the group comprising: a read privilege, an update privilege and/or a delete privilege. Preferably, however, the access privileges associated to the process-instance-roles are read privileges. Since the user responsible for maintaining or inspecting the process only typically needs to view, i.e. read, the resources associated with the process, this ensures that a minimal set of access privileges are granted to the user. Additionally or alternatively, an access privilege may be another privilege such as write, update, create, delete or any other privilege needed by the user in order to undertake his tasks.

Furthermore, the one or more resources may comprise a plurality of resource-versions and during the execution of the process, each process-step may access a specific resource-version, wherein the entries created in step a. determine the respective resource-version and wherein the access privileges created in step c. grant access to the respective resource-version. Accordingly, the present method may be easily extended for supporting resources which are stored in the SOA repository in any number of different resource-versions, so that the user only gets access to the specific resource-versions he is allowed to access.

Furthermore, the created access privileges may be later edited either manually, e.g. by specially authorized personnel, or automatically, e.g. by applying appropriate rules. Editing an access privilege may comprise the actions of adding or removing allowed types of access, completely deleting an access privilege or any kind of other action suitable for fine-tuning the access privileges as needed.

Preferably, the access privileges are WebDAV access control lists (ACLs), which are explained in more detail in the detailed description below. In this case, the creating of appropriate access privileges in step c. may be accomplished by adding a corresponding entry to an ACL associated with the respective resource. Similar to the explanations above, the ACL may only allow read access to the respective resource for the process-instance-role in order to minimize the risk of security breaches, or alternatively any other kind of suitable type of access.

The present technology further relates to a SOA registry and to a SOA repository for granting a user secure access to one or more resources accessed by a process, wherein the SOA registry and the SOA repository are each adapted for use in any of the above presented methods. Furthermore, the technology concerns a SOA environment comprising both a SOA registry and a SOA repository of the above described type. Lastly, the present technology is also directed to a computer program comprising instructions for implementing any of the above methods.

SHORT DESCRIPTION OF THE DRAWINGS

Figure 2:
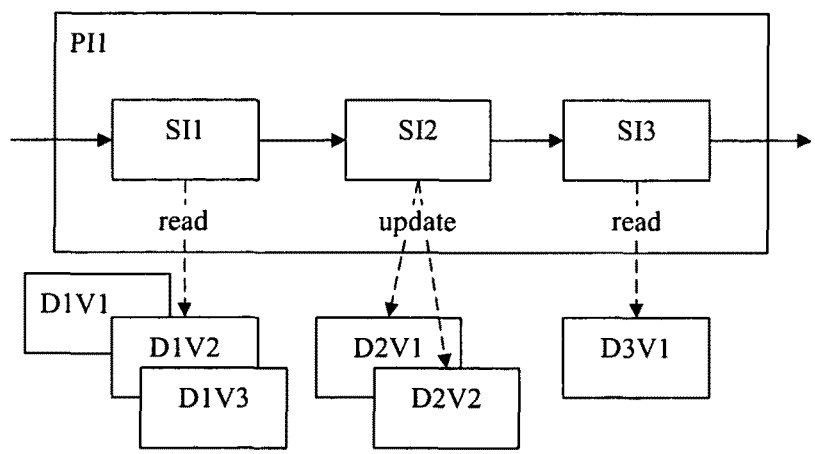
Figure 3:
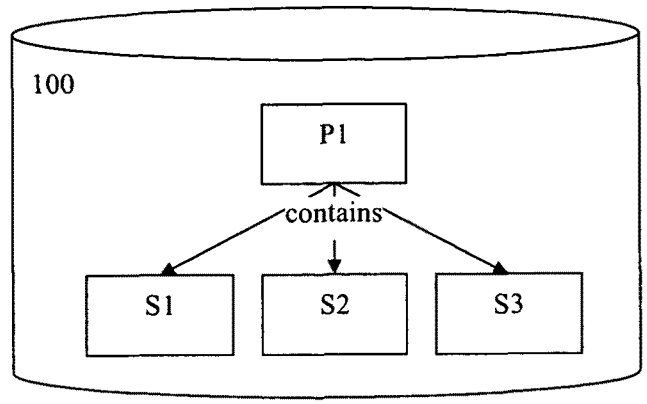
Figure 4:
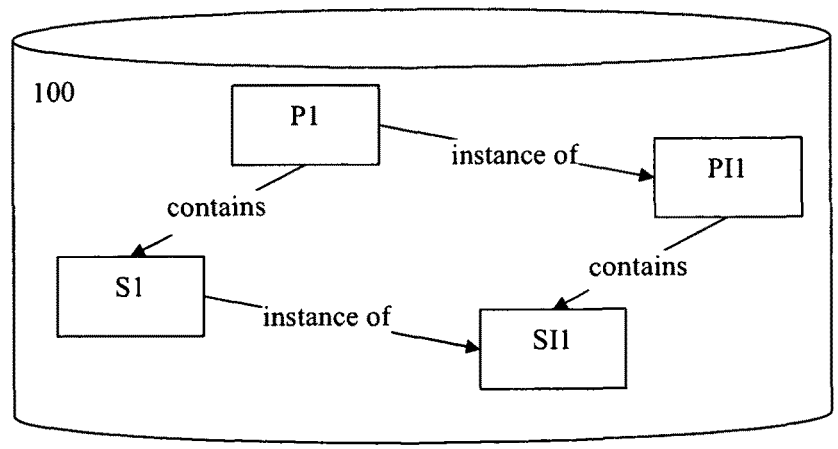
Figure 5:
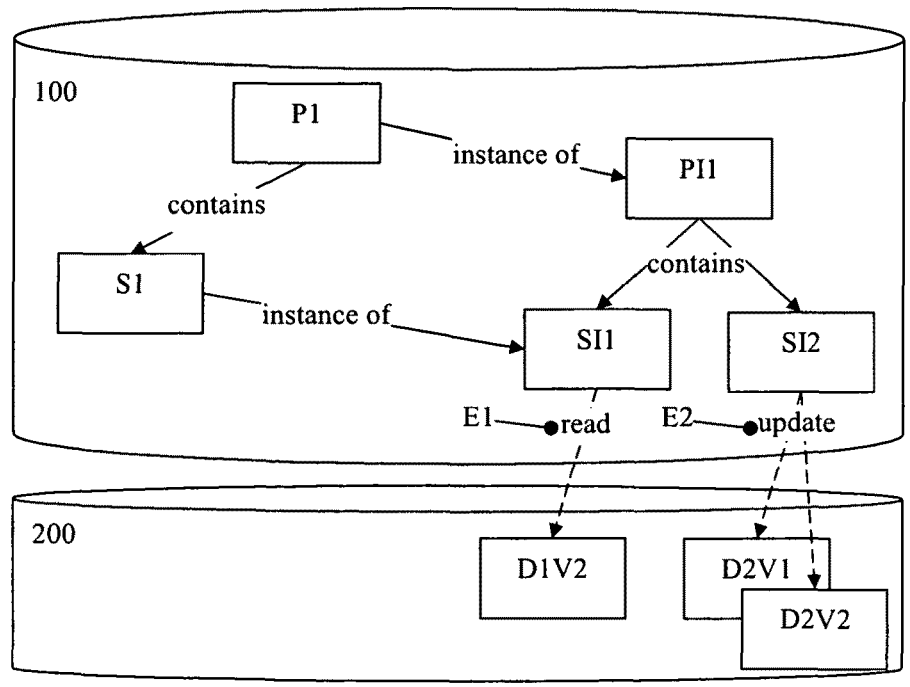
Figure 6:
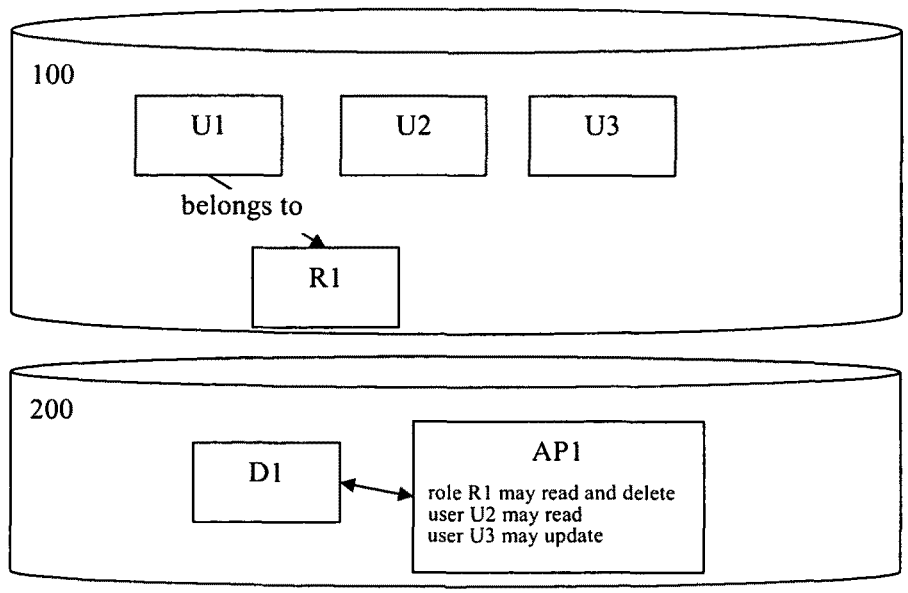
Figure 7:
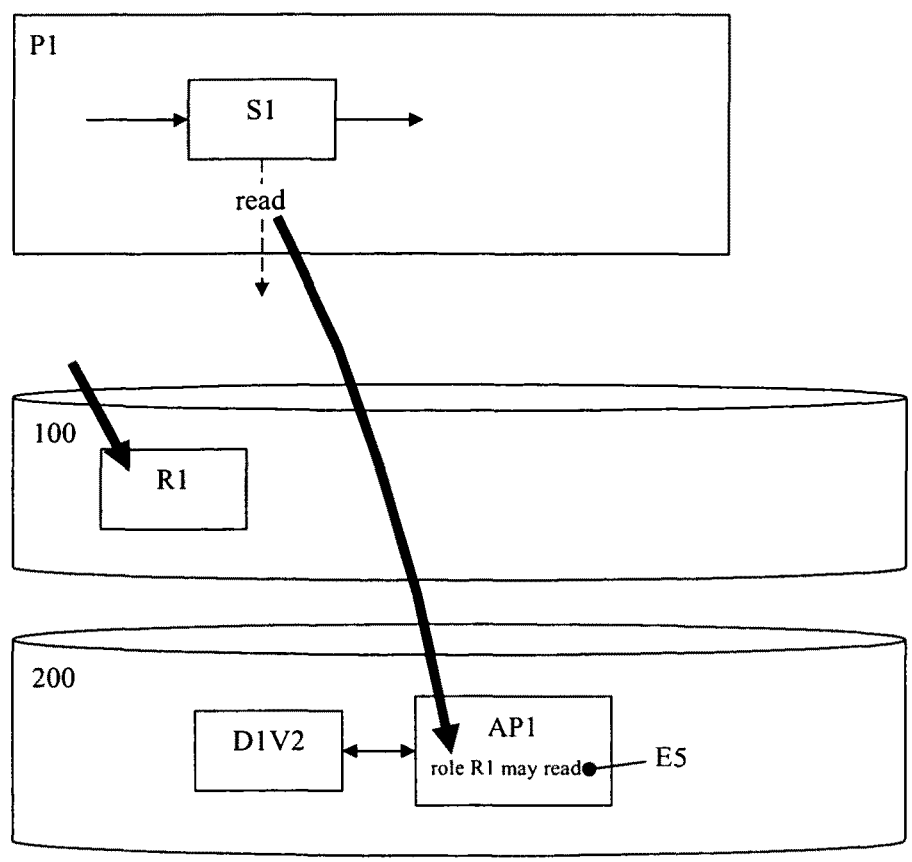
Figure 8:
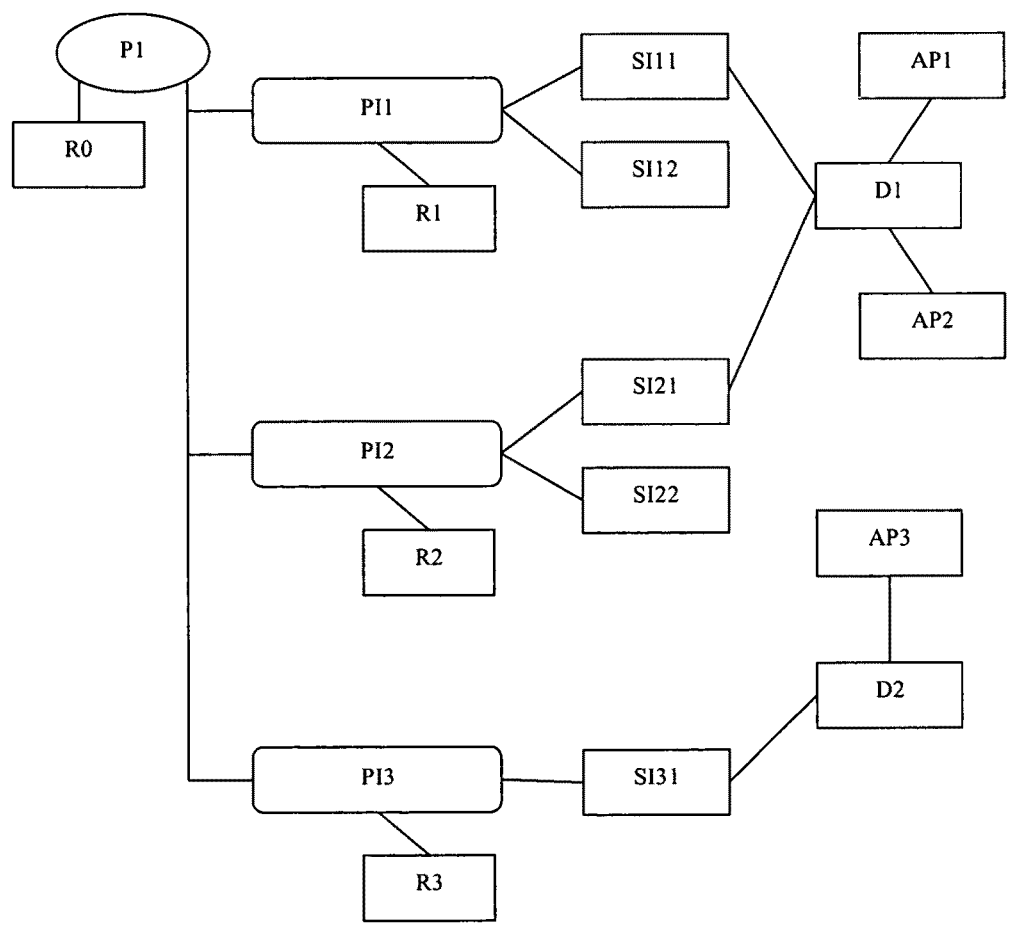
Figure 9:
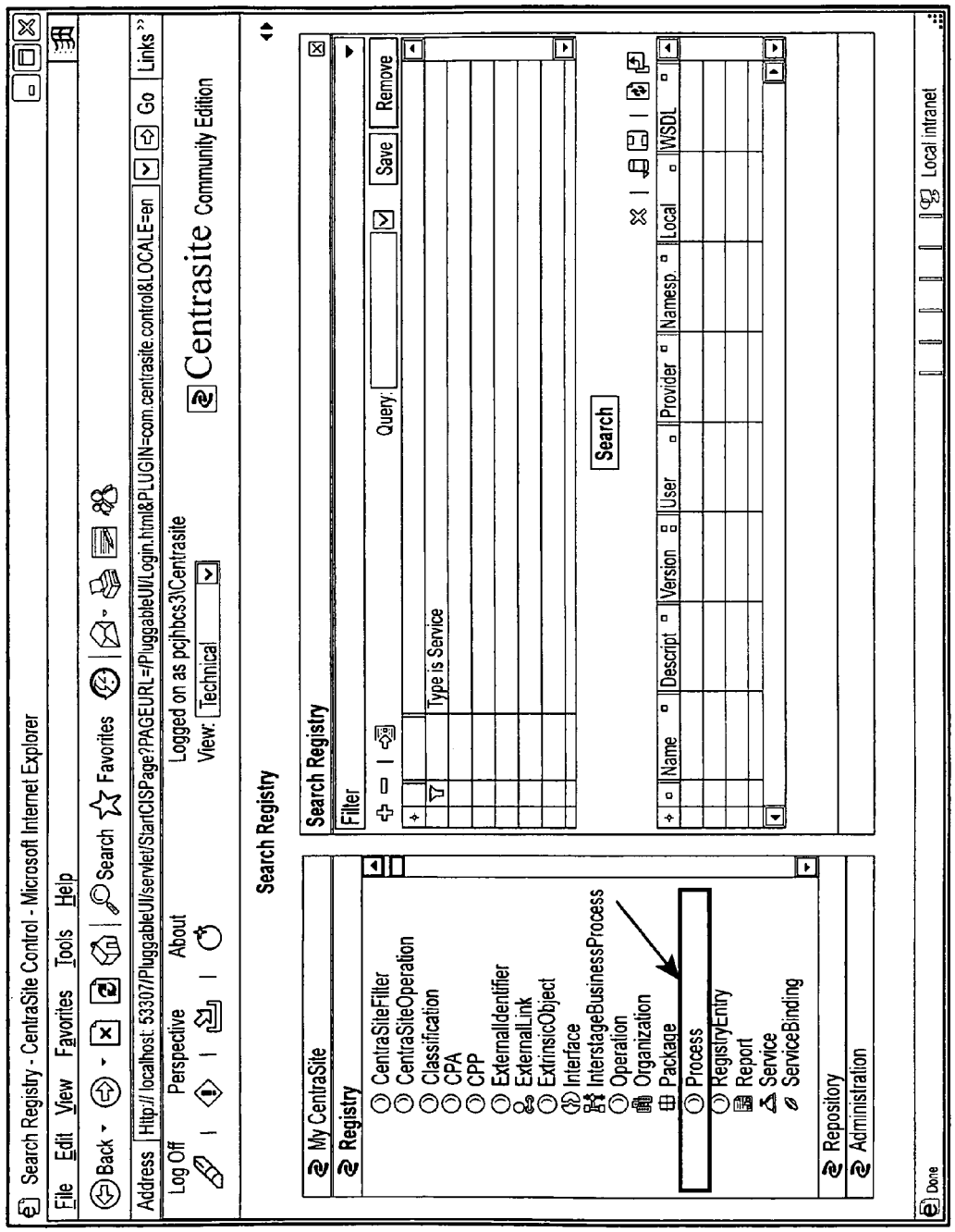
Figure 10:
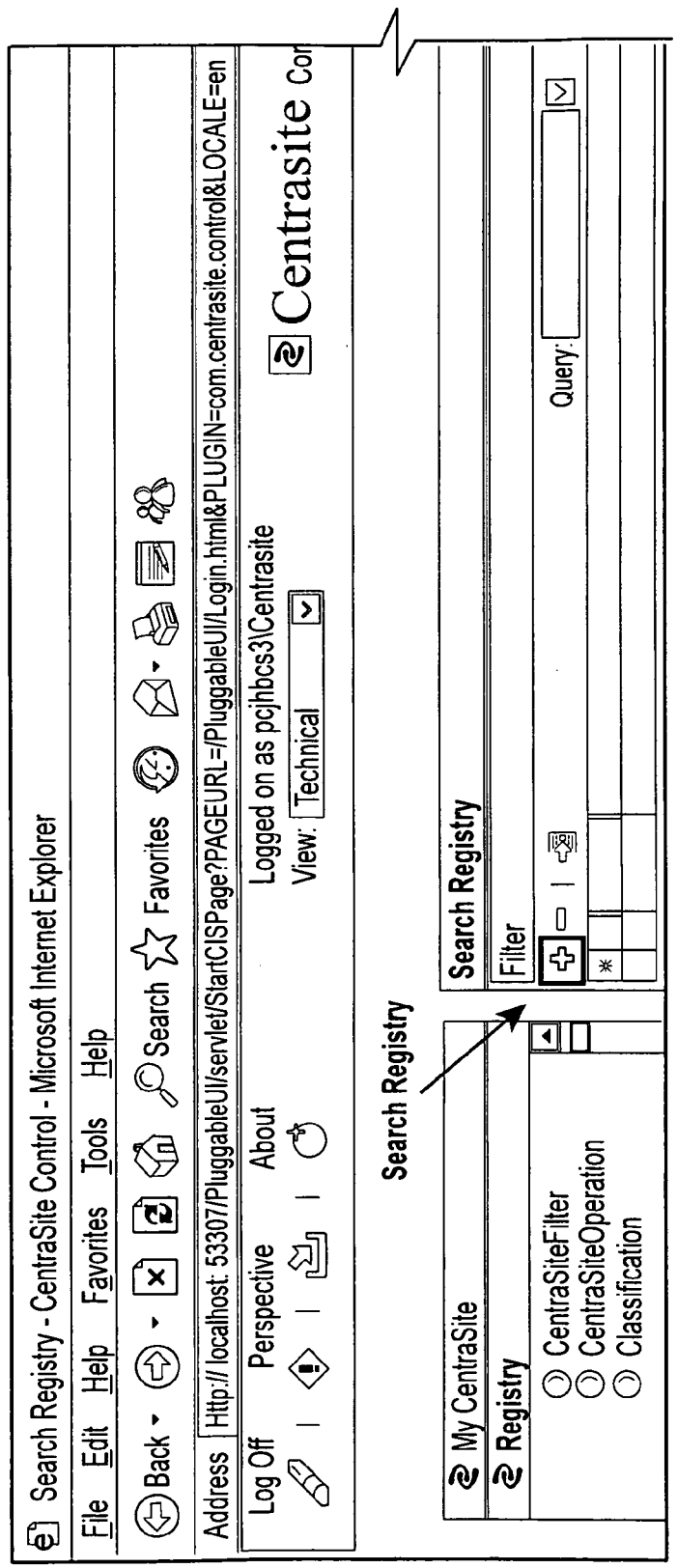
Figure 11:
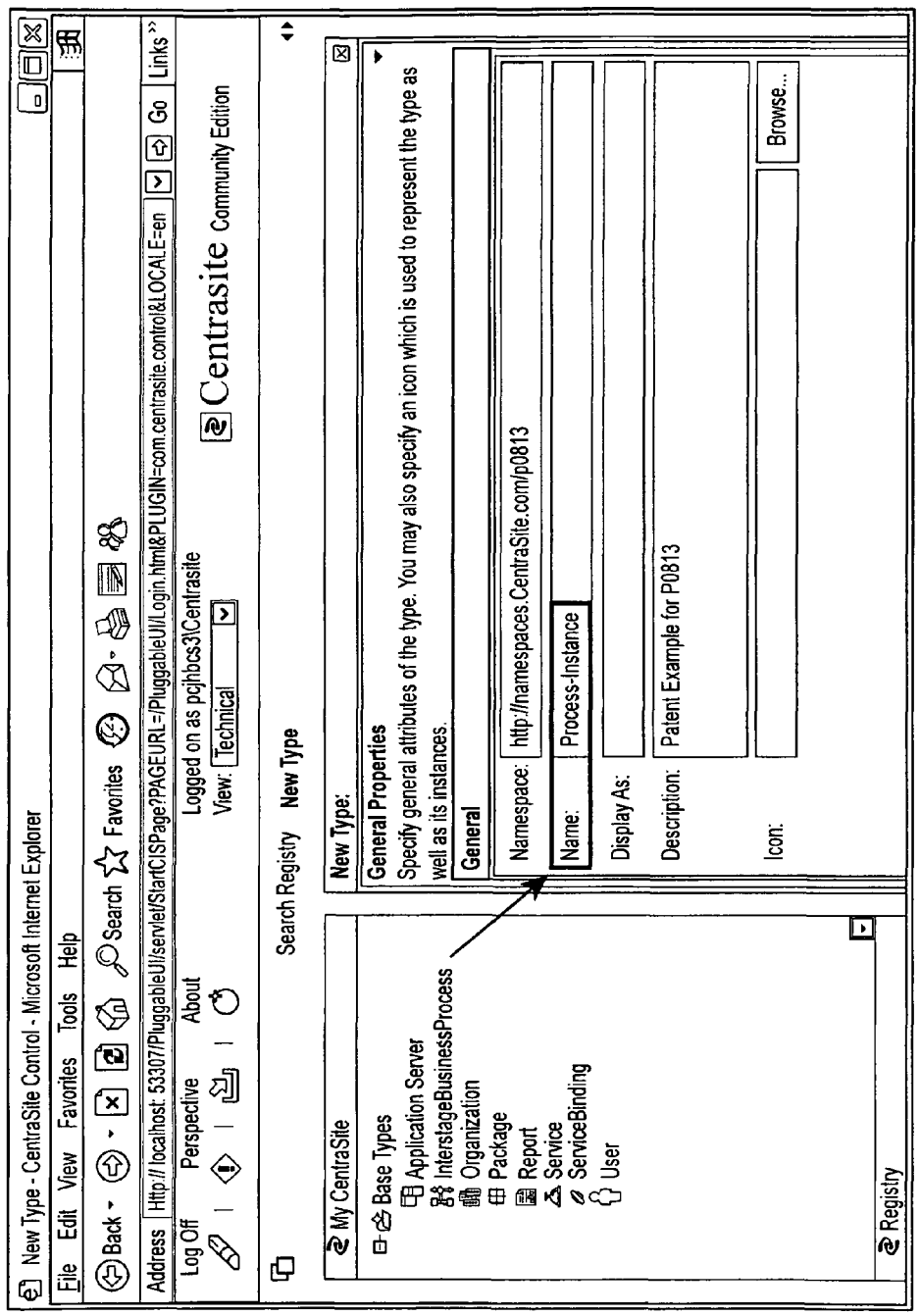
Figure 12:
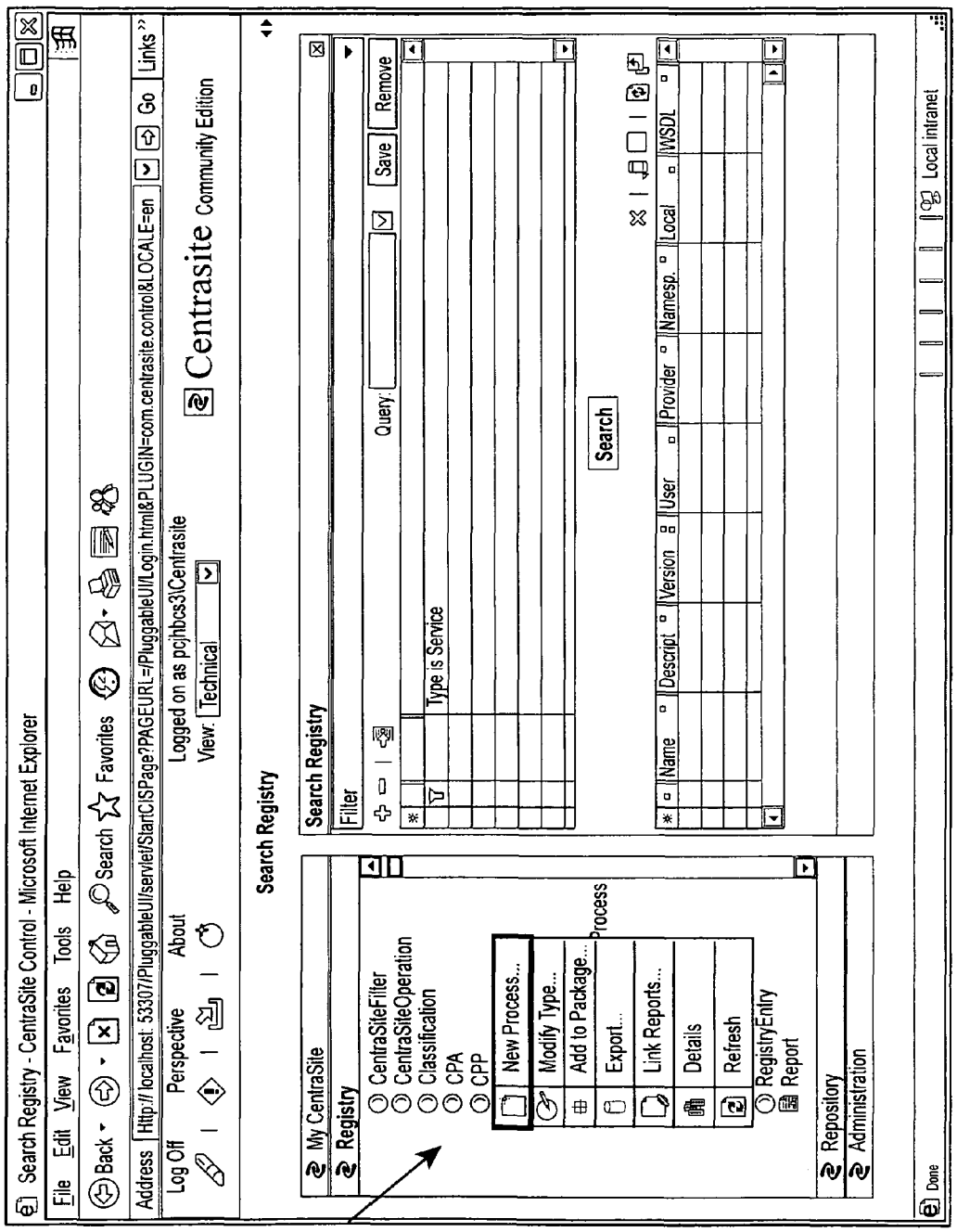
Figure 13:
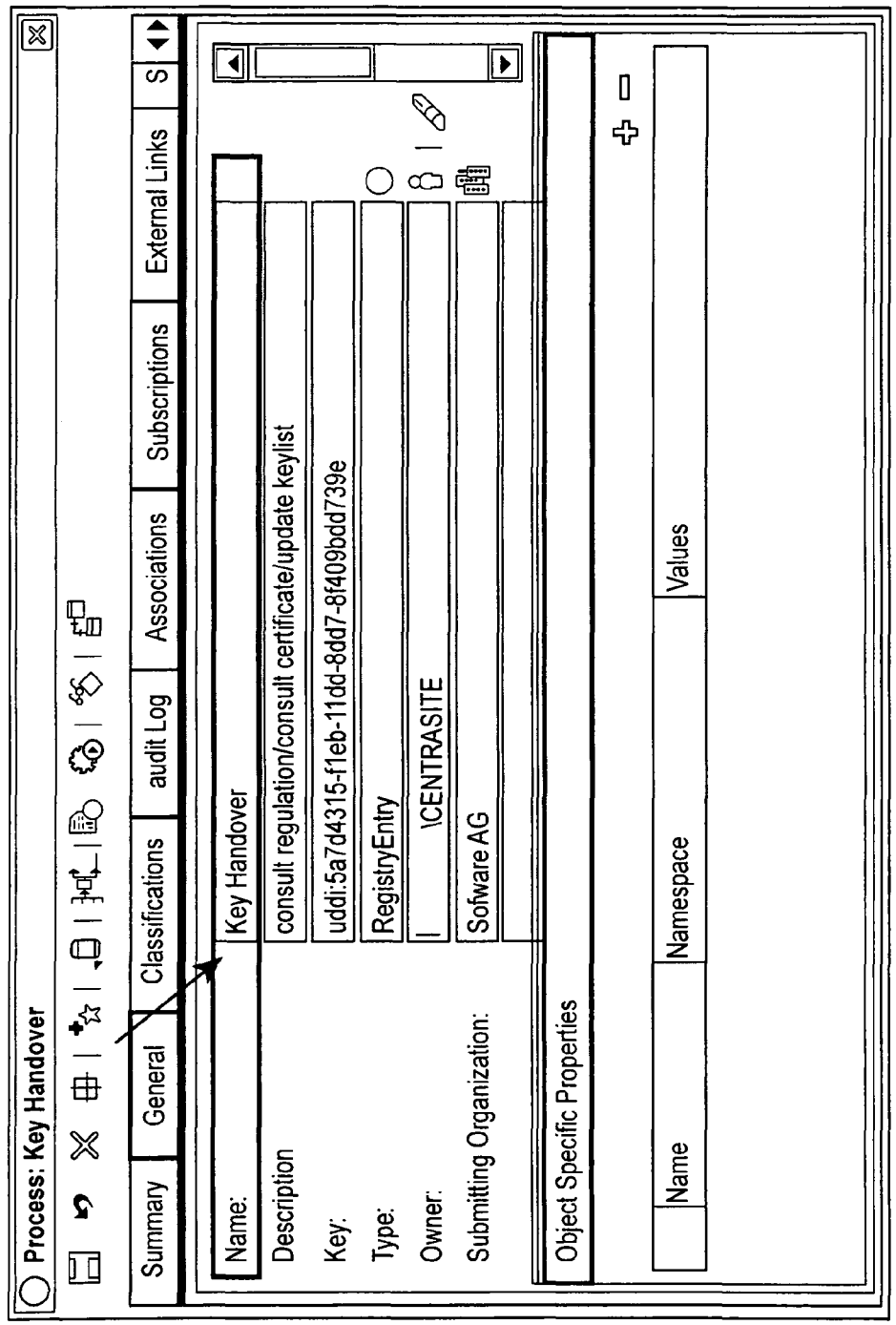
Figure 14:
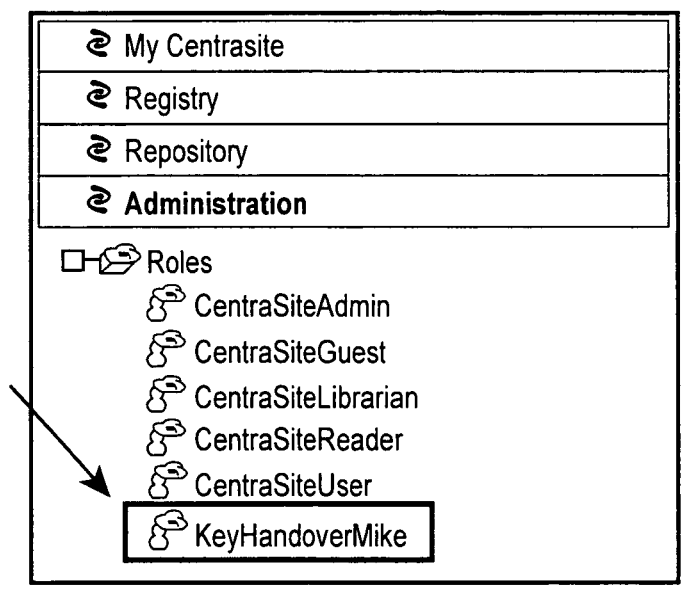
Figure 15:
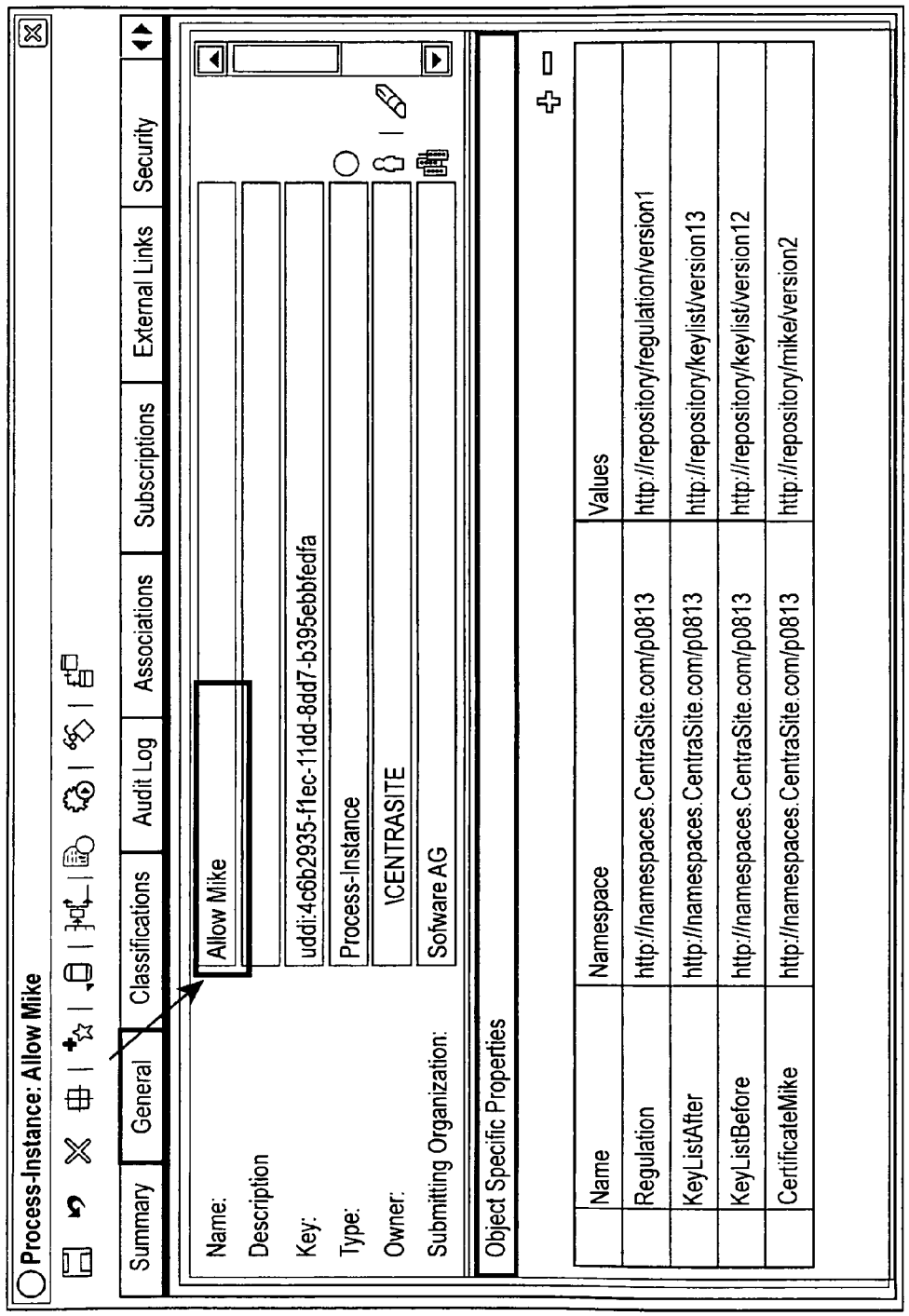
Figure 16:
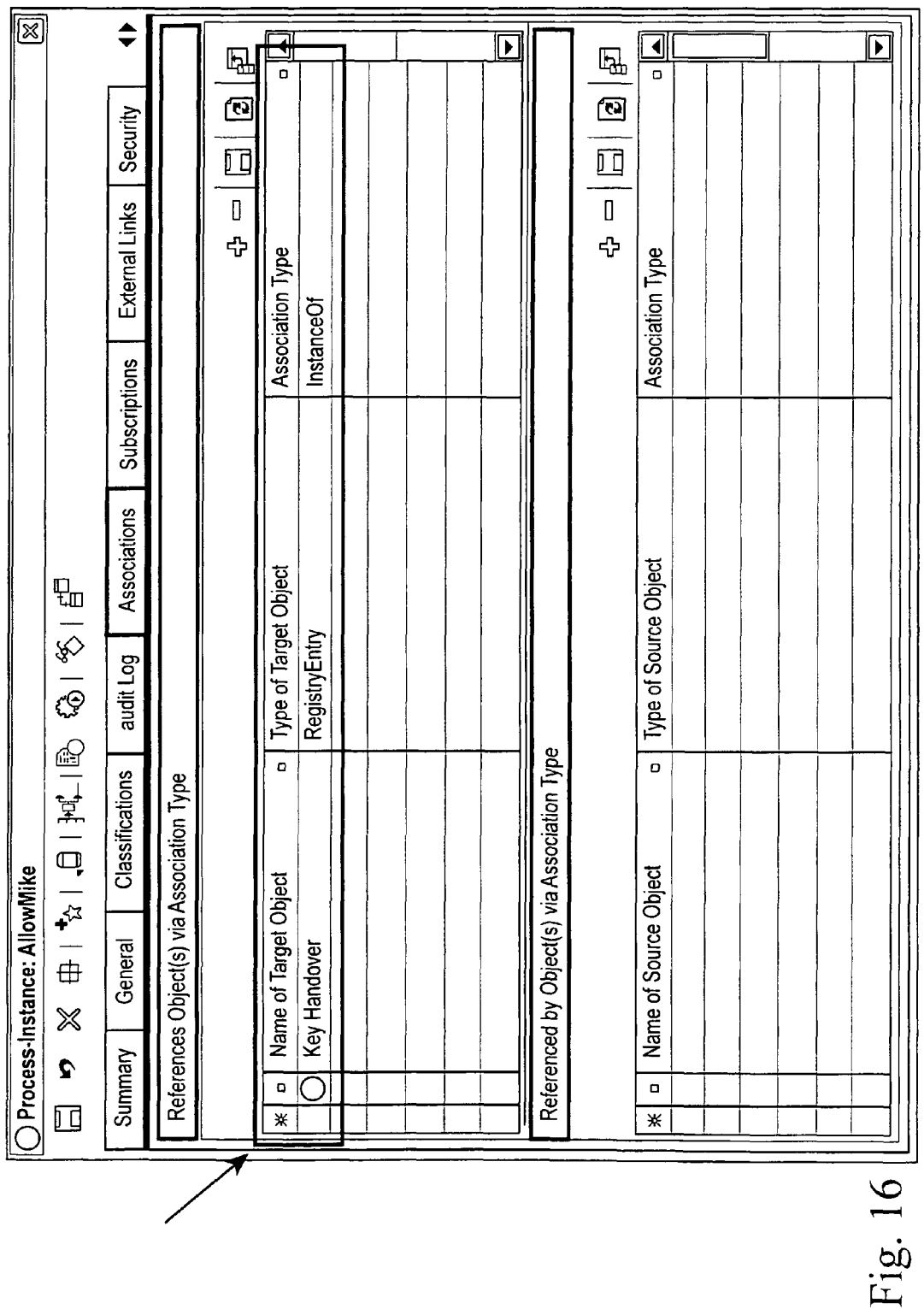
Figure 17:
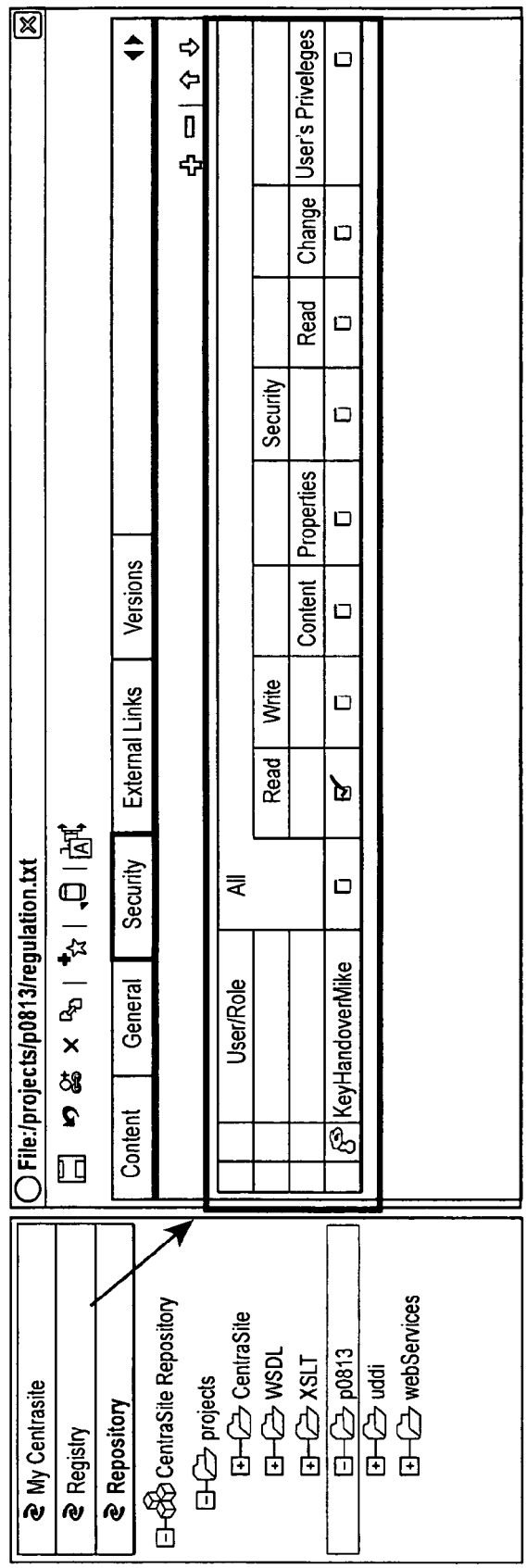

In the following detailed description, presently preferred embodiments of the technology are further described with reference to the following figures:

FIG. 1: A schematic view of a process with process-steps accessing resources according to an embodiment of the present invention;

FIG. 2: A schematic view of a process-instance representing an execution of the process of FIG. 1, wherein each process-step-instance accesses a specific resource-version;

FIG. 3: A schematic view of a SOA registry according to an embodiment of the present invention comprising a definition of a process;

FIG. 4: A schematic view of a SOA registry according to an embodiment of the present invention comprising a process and a corresponding process-instance;

FIG. 5: A schematic view of the SOA registry of FIG. 4 and a SOA repository comprising resource-versions accessed by the process-step-instances according to an embodiment of the present invention;

FIG. 6: A schematic view of a SOA registry comprising users and roles and a SOA repository comprising corresponding access privileges according to an embodiment of the present invention;

FIG. 7: A schematic view of a role and an access privilege being automatically created when a process-step accesses a certain resource according to an embodiment of the present invention;

FIG. 8: A schematic overview of the data structures employed in an embodiment of the present invention;

FIG. 9: A screenshot of the type "Process" in CentraSite of Applicant;

FIG. 10: A screenshot of the creation of a new type in CentraSite of Applicant;

FIG. 11: A screenshot of the creation of a type "Process-Instance" in CentraSite of Applicant;

FIG. 12: A screenshot of the creation of a new process in CentraSite of Applicant;

FIG. 13: A screenshot of the properties of a process in CentraSite of Applicant;

FIG. 14: A screenshot of a process-instance-role in CentraSite of Applicant;

FIG. 15: A screenshot of a process-instance in CentraSite of Applicant;

FIG. 16: A screenshot of an association of a process instance with its corresponding process in CentraSite of Applicant;

FIG. 17: A screenshot of access privileges of a resource in CentraSite of Applicant; and FIG. 18: A screenshot of a process-role in CentraSite of Applicant.

DETAILED DESCRIPTION

In the following, presently preferred embodiments of the technology are described. In a SOA environment, a process may comprise any number of process-steps, wherein the process-steps are typically performed by computer programs such as services. In this context, Service-Oriented Architectures (SOA) are commonly used for controlling the multiple services running on distributed computers in order to work together to execute the process computation. Controlling in this context means that the SOA environment initiates the individual process-steps in the adequate sequence and e.g. transfers the outputs of one process-step to the inputs of the next process-step.

Each process-step may during its execution access process-relevant resources, such as documents, which are either just read by the process-steps, or changed, i.e. created, updated, deleted or the like during the process execution. A user of a process may be a human user or another computer program, service or process. FIG. 1 shows an exemplary process P1 comprising three process-steps S1, S2 and S3, which each access one resource D1, D2 and D3, respectively. More precisely, process-step S1 reads resource D1, process-step S2 updates resource D2 and process-step S3 reads resource D3. It should be appreciated that the example of FIG. 1 is extremely simplified and that a process may comprise thousand or more process-steps, wherein each process-step may access any number, possibly thousands, of resources. Furthermore, a resource may also be accessed by more than one process-step. It should be noted that FIG. 1 depicts the static definition of the structure of the process P1.

FIG. 2 shows an example of the exemplary process P1 being actually executed. Accordingly this distinct process execution, also called a process call or process instance, is denoted by PI1 in FIG. 2 and the process-step-instances SI1, SI2 and SI3 denote the executions of the individual process-steps S1, S2 and S3, respectively. As can be seen in FIG. 2, the resource D1 exists in three different versions D1V1, D1V2 and D1V3, wherein process-step-instance SI1 reads resource-version D1V2. Similarly, process-step-instance SI2 updates the resource D2 from version D2V1 to version D2V2 and process-step-instance SI3 simply reads resource-version D3V1, which is the only version of resource D3 in the example.

Structural Overview of Exemplary Embodiments

In order for the exemplary process P1 to be executed in the SOA environment, the process P1 of FIG. 1 is defined within the SOA registry 100, which is exemplarily shown in FIG. 3. Accordingly, the SOA registry 100 comprises entries representing the process P1 and its process-steps S1, S2 and S3 as well as an association determining the relationship between the process P1 and the process-steps S1, S2, S3 (the relationship is depicted in FIG. 3 by the arrows labeled "contains").

The entries and relationships (as well as the further entries and relationships described in the following) may be defined in the SOA registry 100 by any kind of suitable data structures, such as XML. Furthermore, the relationship between the definition of the process P1 and one of its actual executions (i.e. the exemplary process-instance PI1 of FIG. 2) is depicted in FIG. 4. Accordingly, the SOA registry 100 stores both the definition of the process P1 with its process-steps S1, S2, S3, as well, as the process-instance PI1 and its associated process-step-instances SI1, SI2, SI3. Similar to the definition of the process P1, also the process-instance PI1 may define relationships to its process-step-instances (depicted by the arrow between PI1 and SI1 labeled "contains" in FIG. 4). Preferably, each individual execution, i.e. each process-instance, of a process is logged, i.e. represented in the SOA registry 100 as described above. Accordingly, the SOA registry 100 may comprise more than one process-instance PI1 and corresponding data structures.

In order to facilitate the creation of adequate access privileges according to the present technology, the SOA registry 100 further stores for each process-instance information about which resources were accessed by the individual process-step-instances in which version and in which manner and all this information is combined in the SOA registry 100 and the SOA repository 200 shown in FIG. 5. Accordingly, the SOA registry 100 comprises entries (i.e. pointers or any kinds of other references or data structures) from the process-step-instances to the related resource-versions. The example of FIG. 5 depicts the entries E1 and E2 stored in the SOA registry 100, wherein entry E1 comprises the information that the process-step-instance SI1 reads the resource-version D1V2 and the entry E2 comprises the information that the process-step-instance SI2 updates resource-version D2V1 to resource-version D2V2 (see the dashed lines in FIG. 5). These entries E1, E2 can be stored in the corresponding process-step-instances SI1, SI2 in the SOA registry 100, e.g. in the form of pointers from the process-step-instance entries to the respective resource-versions.

The SOA repository 200, in which the resources and individual resource-versions, respectively, are stored (cf. FIG. 5), must employ some kind of security mechanism for access control to the resources and resource-versions, e.g. an instance-based access mechanism as defined in the WebDAV standard. Such an access mechanism may define access rights upon resources using the three concepts "user", "role" and "ACL" (access control list). As shown in FIG. 6, the exemplary SOA registry 100 has three users U1, U2 and U3, wherein user U1 belongs to the role R1. Furthermore, the SOA repository 200, which comprises the exemplary resource D1, further comprises an access-privilege AP1, e.g. an ACL. The ACL AP1 depicted in FIG. 6 grants read and delete access to the resource D1 for the role R1, but only read access to the resource D1 for the user U2 and update access to the resource D1 for the user U3. It should be appreciated that, while FIG. 6 shows an access-privilege AP1 only for the resource D1, access-privileges may also be defined for individual resource-versions in a similar manner. Generally, a user may belong to any number of roles and a role may comprise any number of users and each resource or resource-version, respectively, in the SOA repository 200 is associated with an ACL which describes which users and/or roles have which access-privileges upon the resource/resource-version.

Operation of Exemplary Embodiments

Processes typically have to be maintained and inspected on a regular basis during their lifetime, especially in the context of security-relevant processes. A revision of a process serves to reconstruct, i.e. to inspect, if the process was carried out appropriately. To this end, a special revisor user follows an execution of the process step-by-step during a revision, wherein for each process-step the user has to view (i.e. read) the resources that are involved with this step. If a revisor user is supposed to revise a process, i.e. to walk through a process execution that involves several different resources in specific versions each having specific security settings defined, the revisor user needs adequate access privileges in order to access the resources. Furthermore, the user first has to gain knowledge about which process-steps were actually executed during the process-execution, which can be difficult or even impossible given the potential complexity of a process. Moreover, defining adequate access privileges is highly difficult for a number of reasons:

In large computer systems scenarios with thousands of resources in different versions are common which are involved in processes to be revised. Defining adequate access privileges to these resources individually for each resource or resource version, as provided by the prior art techniques of instance-based document security, is a highly inefficient or even almost impossible in view of the huge number of resources.

Furthermore, defining such access privileges on demand, i.e. when the revision is due, may cause an undesired delay of the revision, since the access privileges have to be defined prior to the execution of the revision. A delayed revision is highly risky, since it decreases the security of the process, in that security holes may not be detected until it is too late. Additional difficulties arise when access privileges are once defined and the process is later modified. If the modified process involves other resources, the access privileges defined on the individual resources have to be modified accordingly, which may be even more difficult than throughout the initial definition of the process.

The present application solves these problems in that the revisor user can be equipped with the exact and minimal access-privileges he needs in order to inspect the exact resources/resource-versions accessed by a given process execution, as explained in the following.

Returning to FIG. 5, all the above-described information needed by the user is already present in the SOA registry 100 at the time the process inspection is due.

This is because the following tasks are automatically performed in parallel to the execution of the process P1:

- a process-instance data structure PI1 is created in the SOA registry 100, as well as a process-step-instance SI1, SI2 for each process-step performed during the execution of the process
- corresponding entries E1, E2 are created in the process-step-instances SI1, SI2, determining which resources/resource-versions are accessed in which manner by the respective process-step-instance
- the process-instance-role R1 is created in the SOA registry 100 (depicted by the bold arrow in FIG. 7)
- for each access to a resource/resource-version by a process-step, an entry E5 (cf. FIG. 7) is created in an ACL AP1 associated with the respective resource/resource-version which grants read access for the process-instance-role R1 to the respective resource/resource-version (resource-version D1V2 in the example of FIG. 7).

Accordingly, all the prerequisites for a later process revision, inspection or maintenance, i.e. the accessed resources, required access privileges, etc. are automatically created during the execution of the process. Obviously, the SOA registry 100 can be easily extended to automatically perform the above tasks not only during each individual execution of a process P1, but also each time the process P1 is modified, e.g.

when the involved resources are changed. All information stored in the SOA registry 100 and the SOA repository 200 is therefore kept up-to-date and grants a user U1 only the minimal access to the resources/resource-versions. The latter is achieved by simply assigning the process-instance-role R1 to the user U1.

Furthermore, it may be desired to authorize the user U1 to revise all possible process-instances of the process P1. In this context, FIG. 8 shows the exemplary process P1 with three process-instances PI1, PI2 and PI3, i.e. the process P1 has been executed three times and corresponding data structures have been created in the SOA registry 100 as described above.

Allowing the user U1 to access all three process-instances PI1, PI2, PI3 can be achieved in that the user U1 is assigned to all corresponding process-instance-roles R1, R2, R3. However, the present invention provides an even more elegant way for this scenario. To this end, the process P1 shown in FIG. 8 is accompanied by a process-role R0 which is the union of all process-instance-roles R1, R2, R3 of the process-instances PI1, PI2, PI3, i.e. the a user who is assigned the process-role R0 is allowed to perform all actions as if he had all the process-instance-roles R1, R2, and R3 assigned. This concept can be used to build a hierarchy of roles. In that the user U1 is assigned this process-role R0, he is authorized to revise all corresponding process-instances PI1, PI2, PI3.

During the revision of a particular process-instance PI1, PI2, PI3 (cf. FIG. 8) by the user U1, the SOA environment (which steers the revision) only needs to look into the registry entries of the SOA registry 100 representing the respective process P1 and the process-instance PI1, PI2, PI3. In the process-step-instances SI11, SI12, S21, S22, SI31, the system can determine which resources D1, D2 were accessed by the process-step-instances in which manner (as explained above). The looked-up resources D1, D2 (or resource-versions, respectively) are then presented one after another to the user U1, as the user U1 walks through the process-instance step by step. Each time the user U1 wants to inspect, i.e. read, a resource D1, D2 associated with a particular process-step-instance, the security of the resources is handled by instance-based security settings by checking the user's access privileges (according to his role R1, R2, R2 and/or R0) against the access-privileges AP1, AP2, AP3 of the resources D1, D2. Since all access privileges are preferably manifested as ACL entries in the SOA repository 200, each user authorized accordingly can adopt, i.e. edit, these ACL settings, e.g. to allow update access to additional resources or disallow read access to resources underlying more restricted access policies, i.e. for highly-confidential resources. Furthermore, if the user U1 supposed to perform the revision is known before the execution of the process P1, the assignment of the user U1 with the process-instance-role R1, R2, R3 or the process-role R0 can be performed automatically together with the other steps described above (creating the process-instance-roles, access-privileges, etc.).

The example techniques set forth herein are especially advantageous in the context of Business Process Management (BPM) systems, which steer the execution of processes. It should however be noted that the invention is not restricted to business process scenarios, but that any other kind of processes, such as e.g. complex computation processes of engineering data for an automobile under development are supported, as already described above. Business Process Management (BPM) systems specify how processes are undertaken, i.e. they assist users to undertake processes within computer environments. A BPM assists with a process by leading the user (or multiple different users) through a process step-by-step.

Exemplary Implementation

In the following, an exemplary implementation of the above described aspects of the invention is shown. It should however be appreciated that other implementations may be used for achieving the advantageous effects of the present invention.

The exemplary implementation uses CentraSite of Applicant and Java. CentraSite serves in this context as a SOA registry 100 and/or SOA repository 200, wherein the Java program executes the steps of the claimed method. One advantage of the present technology is that the present method can be employed in existing SOA registries/SOA repositories with minimal efforts. Alternatively, it should be appreciated that the present method can also be implemented as an integral part of a SOA registry/repository instead of an external program such as a Java program. Furthermore, the steps performed by the claimed method can also be accomplished by defining suitable policies in a SOA registry/repository, which automatically trigger certain actions. For example could the creation of the process-instance-roles R1, R2, R3 be automatically triggered by a suitable policy as soon as the corresponding process-instance PI1, PI2, PI3 is created, wherein the policy further automatically assigns the newly created process-instance-role R1, R2, R3 to the process-role R0.

In the following, the use of this exemplary implementation is shown in the context of a process "Key Handover". This exemplary process serves for the handover of keys and may be executed to hand over the office key to a newly hired employee. CentraSite serves as a BPM to steer the execution of the process and also as a front-end for the initial definition of the process, which is described in the following.

As can be seen in FIG. 9, the CentraSite Control provides an object-type "Process" in the panel "Registry" under the upper-most node "Taxonomy" and the child node "Object-Type". This object-type "Process" serves to create the new process "Key Handover", i.e. its corresponding registry entry in the SOA registry 100.

The type "Process-Instance", which is required for the creation of the process instances PI1, PI2, PI3 (cf. FIG. 8), during the actual executions of the process "Key Handover", is not predefined in CentraSite. However, new types can be created through an icon in the toolbar (cf. FIG. 10). In the corresponding "New Type" dialog shown in FIG. 11, the name of the new type, in the example "Process-Instance" can be provided.

The description and execution of a process may be accomplished with ontologies. Ontologies may be used for the execution of a process by a central component along a generic process description. Alternatively, the process may be described in the corresponding registry entry, as already presented above. In the latter case, the process execution, i.e. the process-instances may be performed by a Java program, or a program in any other suitable programming language.

Once these prerequisites are performed, the actual creation of the process "Key Handover" may take place. Therefore, the item "New Process" is selected in the context menu of the panel "Registry" under "Taxonomy/ObjectType/Process" in the CentraSite Control (cf. FIG. 12). This creates an instance of the type "Process", which however is not to be mistaken with process-instances corresponding to actual executions of a process. On the contrary, the newly created instance of type "Process" in fact is a CentraSite-representation of the process P1 "Key Handover".

In the following detail view of the new instance of "Process", a name must be provided as a label of the process. In the example of FIG. 13, the process P1 is labeled "Key Handover". In the field "Description", the process-steps S1, S2, S3 of the process P1 are defined ("consult regulation/consult certificate/update keylist" in the example of FIG. 13). Alternatively, a new ObjectType "process step" may be defined and the process-steps S1, S2, S3 may be pointed at from the instance of type "Process". From these steps, also the pointers to the involved resources may originate.

In both scenarios, a Java program, or a program in any other suitable programming language, which executes the process "Key Handover" would then automatically perform the following tasks in parallel to the steps which are necessary for the actual execution of the process:
1. create a new process-instance-role
2. create an instance of type "Process-Instance" which represents the process execution
3. associate this process-instance with the respective instance of "Process"
4. create access privileges to the resources accessed by the process-step-instances during the execution of the process-instance An example of a new process-instance-role in the CentraSite Control is depicted in FIG. 14 (called "KeyHandoverMike" in the example). The creation of a new CentraSite role from a Java program may be accomplished by a PROCESS command onto the SOA registry 100, which adds a new ACL:Group document into the collection ino:security.

An example of a new instance of type "Process-Instance" is depicted in FIG. 15 (called "AllowMike" in the example). This process-instance comprises the pointers to all documents (resources), which are relevant for (accessed during) the execution of the respective process instance. In the example, the process instance "AllowMike" refers to the list of key owners in two versions ("KeyListBefore" and "KeyListAfter"), because this list (the resource) is updated during the execution of the process-instance. Furthermore, a relation between the process "Key Handover" (i.e. the registry entry "Process:KeyHandover") and the new process-instance (i.e. the registry entry "Process-Instance:AllowMike") is created, which is shown in FIG. 16. A Java program may automatically accomplish the creation of CentraSite registry entries and their relations by using JAXR APIs.

Lastly, the process-instance-role "KeyHandoverMike" is granted read access to all relevant (accessed) documents (resources), as can be seen in FIG. 17, which shows an example of the resource "regulation.txt". Accordingly, adequate access privileges are created in this step. The creation of process-instance-roles may be accomplished similar to the creation of ACLs with the Tamino PROCESS command. Accordingly, every user who is assigned the process-instance-role "KeyHandoverMike", is authorized to reproduce if the process instance "AllowMike" is accomplished adequately, i.e. he is authorized to revise the process instance "AllowMike" and all involved resources ("rehglation.txt" in the example).

Figure 18:
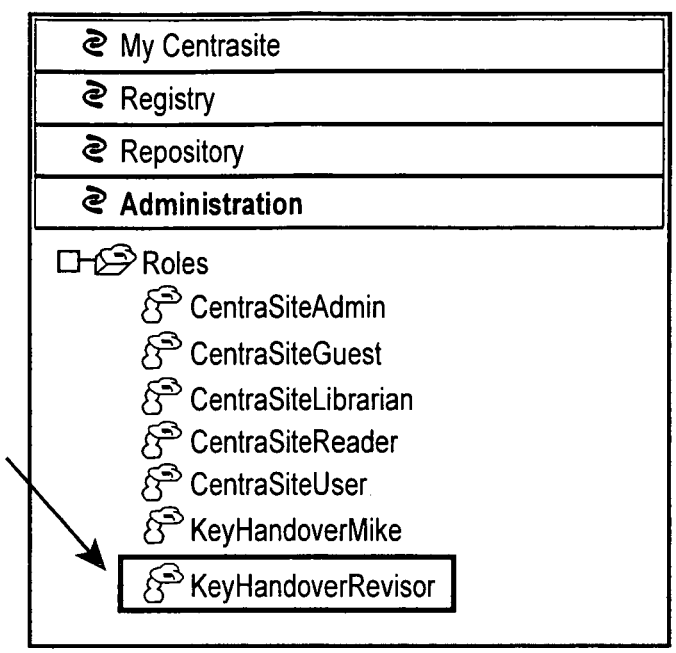

Furthermore, it may be desired to create a further process-role "KeyHandoverRevisor" in parallel to the creation of the registry entry "KeyHandover" of the instance "Process" and to automatically assign all process-instance-roles which are created during the individual key handovers to this further process-role. A user U1 who is assigned the process-role "KeyHandoverRevisor" is then authorized to control, i.e. revise all process instances, as already explained above. An example of such a process-role "KeyHandoverRevisor" is shown in FIG. 18.

The invention claimed is:

1. A method for granting a user secure access to one or more resources accessed by a process, the process being defined in a Service-Oriented Architecture (SOA) registry and comprising one or more process-steps, each process-step accessing one or more resources stored in an SOA repository, the method comprising:
   a. during an execution of the process, for each resource accessed by at least one of the process-steps, creating an entry in the SOA registry determining the accessed resource;
   b. creating a process-instance associated with a respective process-step-instance in the SOA registry, the process-step-instance representing a respective process-step, and creating a process-instance-role in the SOA registry;
   c. creating, for each resource accessed by at least one of the process-steps corresponding to the respective process-step-instance, an access privilege in the SOA repository that grants access to the respective resource for the process-instance-role; and
   d. assigning the process-instance-role to the user.

2. The method of claim 1, wherein b. and c. are also performed during the execution of the process.

3. The method of claim 1, further comprising:
   creating a process-instance in the SOA registry representing the execution of the respective process;
   for each process-step executed by the process, creating a process-step-instance in the SOA registry representing the respective process-step and creating a relationship to the respective process-instance;
   wherein the entries created in a. are added to the respective process-step-instance.

4. The method of claim 1, wherein the entries created in a. determine a type of access to the respective resource, wherein the type is at least one of the group comprising: create, update and/or delete.

5. The method of claim 1, further comprising:
   creating a process-role in the SOA registry;
   adding the process-instance-roles to the process-role; and
   assigning the process-role to the user.

6. The method of claim 1, wherein each of the one or more access privileges is at least one of the group comprising: a read privilege, an update privilege and/or a delete privilege.

7. The method of claim 1,
   wherein the one or more resources comprise a plurality of resource-versions and during the execution of the process, each process-step accesses a specific resource-version;
   wherein the entries created in a. determine the respective resource-version; and
   wherein the access privileges created in c. grant access to the respective resource-version.

8. The method of claim 1, further comprising automatically and/or manually editing the access privileges.

9. The method of claim 1, wherein the access privileges are WebDAV ACLs.

10. The method of claim 9, wherein c. comprises creating an entry in an Access Control List (ACL) of the respective resource.

11. The method of claim 10, wherein the ACL allows read access to the respective resource for the process-instance-role.

12. A system at least one processor and an SOA repository for granting a user secure access to one or more resources accessed by a process, the SOA repository being configured for use in a method according to claim 1.

13. A system having at least one processor and an SOA environment comprising the system having the SOA repository of claim 12.

14. The method of claim 1, wherein for each resource accessed by the at least one of the process-steps during the execution of the process, creating a read privilege in the SOA repository that grants read access to the respective resource for the process-instance-role, so that the process-instance-role is granted read access to the resources accessed by the corresponding execution of the process and is prevented from accessing other resources which do not relate to the corresponding execution of the process.

15. The method of claim 1, wherein a user is granted access to revise one or more process-instances based on the process-role corresponding to the one or more process instances.

16. A system comprising at least one processor and an SOA registry executed using the processor, the SOA registry used for granting a user secure access to one or more resources accessed by a process, the SOA registry configured to:
   a. during an execution of the process, for each resource accessed by at least one of the process-steps, create an entry in the SOA registry determining the accessed resource;
   b. create a process-instance associated with a respective process-step-instance in the SOA registry, the process-step-instance representing a respective process-step, and create a process-instance-role in the SOA registry;
   c. create, for each resource accessed by at least one of the process-steps corresponding to the respective process-step-instance, an access privilege in the SOA repository that grants access to the respective resource for the process-instance-role; and
   d. assign the process-instance-role to the user.

17. A system having at least one processor and an SOA environment comprising the system having the SOA registry of claim 16.

18. The system of claim 16, wherein the SOA registry is further configured to:
   create a process-instance in the SOA registry representing the execution of the respective process;
   for each process-step executed by the process, create a process-step-instance in the SOA registry representing the respective process-step and create a relationship to the respective process-instance;
   wherein the entries created in a. are added to the respective process-step-instance.

19. A non-transitory computer-readable storage medium storing a computer program which, when executed by an information processing apparatus having at least one processor, cause the apparatus to perform functionality comprising:
   a. during an execution of the process, for each resource accessed by at least one of the process-steps, creating an entry in the SOA registry determining the accessed resource;
   b. creating a process-instance associated with a respective process-step-instance in the SOA registry, the process-step-instance representing a respective process-step, and creating a process-instance-role in the SOA registry;
   c. creating, for each resource accessed by at least one of the process-steps corresponding to the respective process-step-instance, an access privilege in the SOA repository that grants access to the respective resource for the process-instance-role; and
   d. assigning the process-instance-role to the user.

20. The non-transitory computer-readable storage medium of claim 19, wherein the apparatus is further caused to perform functionality comprising:
   creating a process-instance in the SOA registry representing the execution of the respective process;
   for each process-step executed by the process, creating a process-step-instance in the SOA registry representing the respective process-step and creating a relationship to the respective process-instance;
   wherein the entries created in a. are added to the respective process-step-instance.

* * * * *